(No Model.)
J. J. PARKER.
DRAG SAW.
No. 322,473. Patented July 21, 1885.
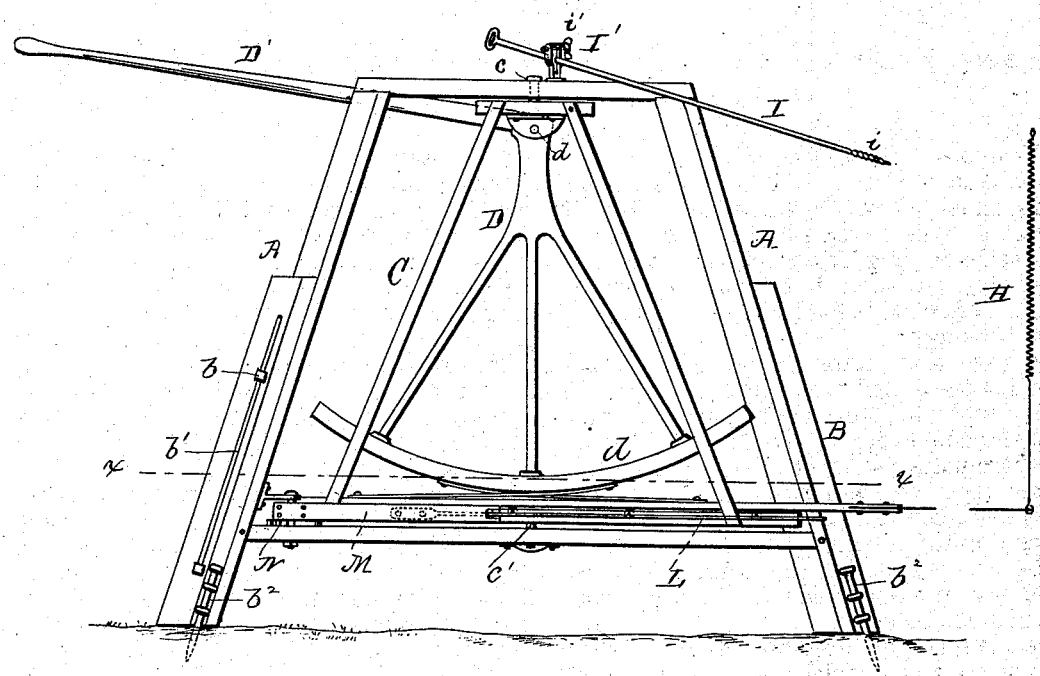
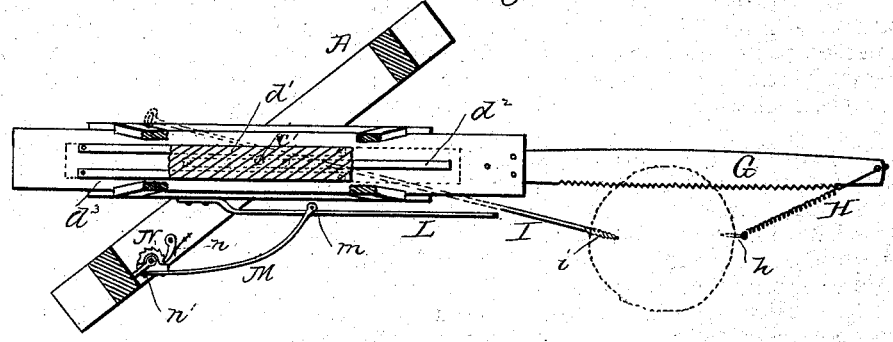
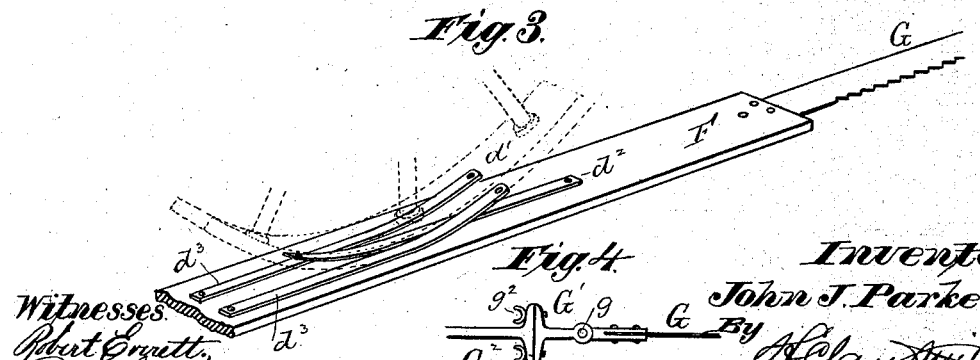
Witnesses
Robert Emmett
R. E. Traut
Inventor
John J. Parker
By H. Clay Smith
Atty.

UNITED STATES PATENT OFFICE.

JOHN J. PARKER, OF AITKIN, MINNESOTA, ASSIGNOR TO WILLIAM W. PARKER, OF SPEARFISH, DAKOTA.

DRAG-SAW.

SPECIFICATION forming part of Letters Patent No. 322,473, dated July 21, 1885.

Application filed February 14, 1885. (No model.)

*To all whom it may concern:*

Be it known that I, JOHN J. PARKER, of Aitkin, in the county of Aitkin and State of Minnesota, have invented a new and useful Machine for Sawing Down Timber, which machine is fully set forth in the following specification, reference being had to the accompanying drawings.

This invention relates to sawing-machines for felling trees, and other purposes; and the novelty consists in the construction, arrangement, and adaptation of parts, as will be more fully hereinafter set forth, and specifically pointed out in the claims.

I will, for convenience, describe the invention as applied to the felling of trees; but it will be understood that the essential features of the invention may be used in other relations and combinations.

The invention is illustrated in the accompanying drawings, which form a part of this specification, and in which—

Figure 1 is a side elevation. Fig. 2 is a horizontal section taken on the line $x\,x$ of Fig. 1. Fig. 3 is a perspective detail showing the relations of the saw, the saw-carrier, the swinging segment, and the connecting-strap. Fig. 4 is a detail.

Referring to the drawings, A designates the main frame, having extension-legs B, adjustably secured to the frame A by set-screws $b$, which, passing through slots $b'$ in the extensions, engage the main frame to adjust the machine to side hills or to other uneven surfaces. The extensions B have adjustable pins $b^2$, which pass into the ground and afford a secure bearing to the frame. The upper horizontal cross-bar of the main frame supports a clamp, I', in which is adjustably held, by a set-screw, $i'$, a brace-bar, I, having a gimlet end, $i$. The frame A B having been set in proper relation to the tree to be operated upon, the brace-bar I is placed against the tree and screwed into the same until it obtains a sufficient hold, when by tightening the set-screw $i'$ to clamp the bar I the tree is utilized as a means for sustaining the machine in a working position.

To the main frame of the machine and centrally upon the horizontal bars thereof, above and below, at $c$ and $c'$, respectively, is pivoted an oscillating frame, C, which in proper guides supports a saw-carrier, F. This carrier F supports the saw G, and the frame C may be oscillated upon its pivots to bring the saw G into working position, as shown in Fig. 2.

To the end of the saw I attach a spiral spring, H, which, by a proper screw or nail, $h$, may be secured to the tree to be operated upon at a point above the plane of the saw. This spring is of just sufficient strength to properly support the saw against sagging, but allows its free reciprocal motion.

Pivoted at $d$, in a stout bearing in the frame C, is a swing-frame, D, having an operating-lever, D', and carrying a segment, $d'$, made in the arc of a circle having the pivot $d$ for a center. When the frame D is being operated, the point of the segment under the pivot will lie close to the carrier F, whatever the position of its stroke. This serves efficiently to hold the carrier F against upward movement, and avoids the necessity of guides for that purpose, which guides would necessarily increase friction and call forth a greater amount of labor.

Two spring metal or other flexible straps, $d^3\,d^3$, secured to the back end of the carrier, are secured by their opposite ends to the lower surface of the opposite side of the segment, while a single strap, $d^2$, secured at one of its ends to a point near the front end of the carrier, passes between the straps $d^3$, and is similarly secured to the opposite side of the segment, as seen in Fig. 3.

L designates an arm arranged parallel with the side of the base of the frame C and secured thereto. It serves as a track for a grooved roller, $m$, carried upon the end of a spring-arm, M. This spring-arm is rigid with or held by a ratchet, N, journaled in a bracket, $n'$, upon the frame A, and a pawl or dog, $n$, serves to hold the ratchet in one direction.

While the lever D' is a convenient means for oscillating the frame C and bringing the saw G to its work, I relieve the operator from the labor and attention necessary to feed the saw forward. By turning the ratchet N in the proper direction, the spring-arm M is bent, and it exerts a constant force to feed the saw forward to its work.

In Fig. 4 I show an adjustable clamp, the carrier being pivoted at $g$, and disks $G'$ $G^2$ being adjustably secured together by set-screws $g^2$. By this means the angle of the saw may be changed at will.

By my invention I may saw very close to the surface of the soil, so as to leave very little subsequent stump-work. The position of the machine may be readily changed to vary the angle of the cut.

In details of construction, modifications may be made within wide limits without departing from the principles or sacrificing the advantages of the invention, the essential features of which will be readily understood from the foregoing description.

I attach importance to the means for adjusting the frame and the saw to the work, and for utilizing the tree as a support; to the segment and its connections to the saw, and to the means for progressive feeding forward independent of the operator.

The arrangement of straps shown serves to apply the force to the carrier in a direct line, the strap $d^2$ being attached to the carrier and segment upon a central line, and the straps $d^3$ equidistant from the center upon either side.

What I claim as new is—

1. In a sawing-machine, substantially as described, the combination, with a main frame comprising two standards, as A, with extension legs, as B, of a clamp, as I', carried upon the upper cross-bar of said frame, and a rod having an end to be engaged with the tree and a shank to be engaged by the clamp, whereby the proper position of the machine may be obtained and the tree used as a support, as set forth.

2. The combination, with a main frame, and an inner frame, as C, centrally pivoted therein, of a reciprocating carrier supported on the inner frame, and a swing-frame pivoted within the frame C, having connections with the saw, whereby horizontal and vertical movements is obtained by lever D', as set forth.

3. In a sawing-machine, substantially as described, a swinging segment, as D $d'$, pivoted in a horizontally-oscillating frame, as C, and supported over and in close proximity to a reciprocating saw-carrier working in guides in said frame C, in combination with such carrier, and with elastic straps securing the segment to the carrier, and running in opposite directions from their points of attachment to the carrier to opposite sides of the segment, as set forth.

4. The combination, with the carrier F, supported in an oscillating frame, as C, of a swinging frame pivoted centrally in said frame C over the path of the carrier, and having a segment supported against the carrier, an operating-lever for moving the frame D upon its pivots in a vertical direction and the frame C upon its pivots in a horizontal direction, and flexible straps securing the segment to the carrier, as set forth.

5. The combination, with the carrier F and the saw, of the pivoted oscillating frame D, having segment $d'$, the straps $d^3$, arranged near the outer edges of the carrier and connecting its rear portion with the opposite side of the segment, and the strap $d^2$, arranged reversely between the straps $d^3$ to apply uniform central force to the carrier in each direction of its stroke, as set forth.

6. The combination, with the frame A B, supported upon one side of the tree being operated upon by an adjustable bar, as I, and with a felling-saw and its carrier reciprocating in said frame, of a spiral spring, H, having a fastening device, as $h$, secured at one end to the free end of the felling-saw and at the other end to the side of the tree opposite the frame, as set forth.

7. In a sawing-machine, substantially as described, the combination, with a saw-carrier having a longitudinal track, as L, of a spring-arm, M, attached to the supporting-frame of the saw and having a friction-roller, $m$, engaged with said track, and a dog for holding the arm in a strained position in the direction of the work, as set forth.

8. The combination, with the frame A B and brace-rod for connecting said frame to the tree being operated upon, of a horizontally-oscillating frame, as C, supporting the saw-carrier, a vertically-swinging frame having a segment connected to the carrier, and a spring-arm for holding the saw to the work, as and for the purposes set forth.

JOHN J. PARKER.

In presence of—
GEO. T. WILLIAMS,
R. C. McMURDY.